Aug. 18, 1931.  J. H. KOEBEL  1,819,899
CULTIVATOR GUARD
Filed Feb. 15, 1929
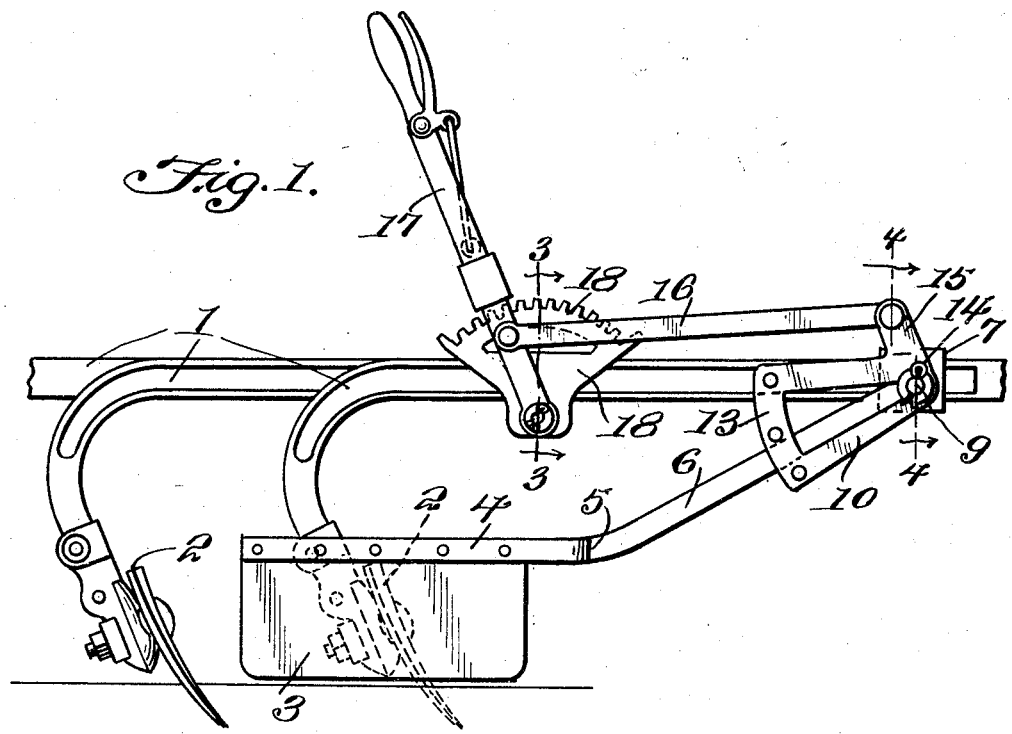
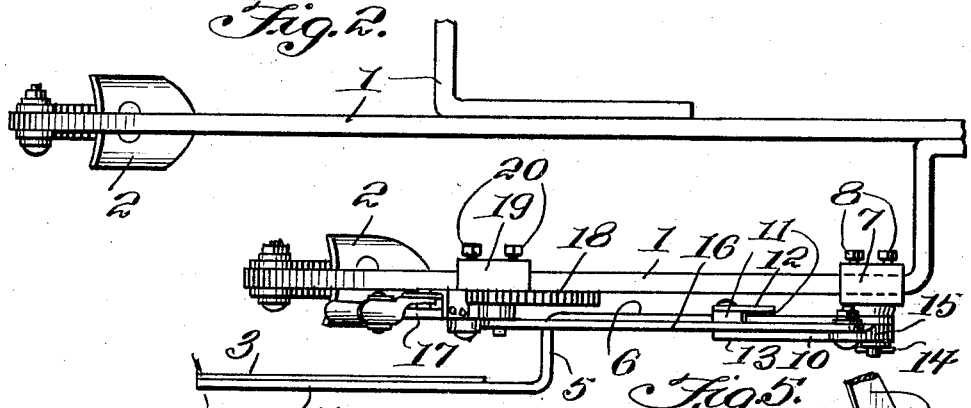
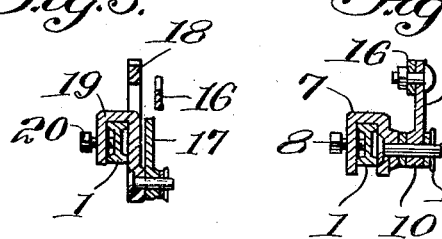
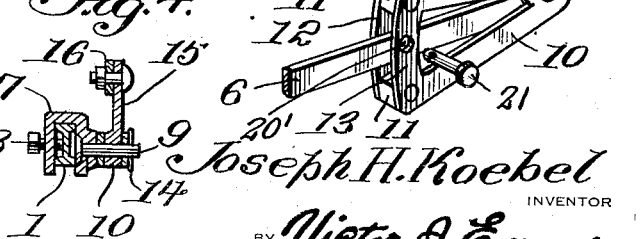
Joseph H. Koebel
INVENTOR
BY Victor J. Evans
ATTORNEY
WITNESS: J. T. L. Wright Patented Aug. 18, 1931

1,819,899

UNITED STATES PATENT OFFICE

JOSEPH H. KOEBEL, OF LOWELL, IOWA

CULTIVATOR GUARD

Application filed February 15, 1929. Serial No. 340,163.

My present invention has reference to a guard for cultivators designed to be arranged adjacent to the outside tooth or plow point of a cultivator frame so that the same will run between the said outermost tooth and the adjacent row of corn to prevent the corn from being covered by the material displaced by the tooth.

An object is the provision of a guard for this purpose which may be adjusted by the operation of a lever, to arrange the same in proper position to ride over the ground surface regardless of the depth at which the teeth or shovel points of the cultivator enter the ground.

A further and important object is the provision of a guard for this purpose that is so mounted on the cultivator frame as to permit the said shield riding over uneven ground surfaces as well as over sticks or stones which may be in the path of contact therewith so that the said guard will offer no obstruction to the free operation of the cutivator.

A further and important object is the provision of a guard for cultivators that may be removably and adjustably attached to the beam or frame of the cultivator.

To the attainment of the above broadly stated objects and others which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a side elevation of a sufficient portion of a cultivator to illustrate the application of my improvement thereon.

Figure 2 is a top plan view thereof.

Figure 3 is a sectional view on the line 3—3 of Figure 1.

Figure 4 is a sectional view on the line 4—4 of Figure 1.

Figure 5 is a detail perspective view to illustrate the manner in which the bar of the shield is received between the widened end of the yoke member of the improvement.

Referring now to the drawings in detail, the numeral 1 designates the beams that constitute the cultivator frame. Each of these beams has attached to its arched end a plow point or tooth 2.

On the beams carrying the outermost teeth 2 I mount my improvement.

The improvement necessarily includes a guard 3. Preferably the shield is in the nature of a flat metal plate. The guard has fixedly secured on its upper edge a bar 4. The bar has a forward offset portion 5, and is thence continued at an upward angle, as at 6, and is pivoted to the side of the cultivator frame in a manner which will presently be set forth.

Embracing the mentioned outer beam of the cultivator frame there is a U-shaped bracket 7. An adjustable binding element 8 is threaded through the inner arm of the U-shaped bracket for removably fixing the same on the frame 1. The outer arm of the U-shaped bracket carries an outstanding pivot 9 and this pivot passes through an opening in the outer end of the part 6 of the bar 4. The pivot also passes through an opening in the inner and narrow end of a substantially triangular member which is preferably cut away at the center thereof and which I will refer to as a yoke. The yoke is indicated by the numeral 10, and the widened end thereof has at its corners lugs or enlargements 11 to which are secured a segmental plate 12. The plate 12, together with the outer arm 13 of the yoke 10, provide a guide for the parts 6 of the bar 4. Suitable washers or like spacer elements may be arranged on the pivot between the bar and the yoke, and a removable element, such as a cotter pin 14 passes through the pivot for holding the yoke thereon.

The inner and narrow end of the member 10 which I have referred to as the yoke, is formed with an upwardly directed arm 15 to which is pivoted a link 16. The link 16 is in turn pivoted to a lever 17, the said lever having its lower end pivotally connected to a segmental rack 18. The lever carries a handle operated spring influenced pawl or dog for engaging with the teeth of the rack 18. The rack 18 has formed on its inner face an angle bracket 19 and passing through the depending arm of this bracket there is a binding element such as a bolt 20 which contacts with the inner face of the frame member 1 and thereby secures the rack and lever on the cultivator frame.

My improvement is of a comparatively simple construction and may be adjustably and removably fixed upon any ordinary cultivator frame.

The lever 17 is operated to throw the yoke to a position to permit of the rod 4 being arranged between the lugs or stop elements 11 on the widened end of the yoke so that the guard 3 will freely ride over the ground surface. The lower corners of the guard 3 are rounded, so that should the guard contact with an obstacle such as a stick or stone the same will ride thereover. Obviously the same will ride over uneven ground surfaces. By swinging the lever 17 the lower element 11 on the yoke will contact with the lower edge of part 6 of the rod 4 to raise and sustain the guard at any desired height with respect to the shovel blades or teeth 2, and obviously such adjustment is made without necessitating the driver of the cultivator leaving his seat or employing tools.

As disclosed by the drawings the outer and widened end of the yoke has a central opening 20' therethrough and through this opening there is designed to be inserted a pin 21. By reference to Figure 1 of the drawings it will be seen that the pin will contact with the upper edge of the angle portion 6 of the bar 4 when the guard is in lowered position and obviously the pin 21 will underlie and support the arm 6 when the guard is raised. This arrangement is desirable when the guard is to be locked either raised or lowered on the yoke, and in this instance the guard is employed for cutting the soil.

While I have illustrated a satisfactory embodiment of the improvement I do not wish to be restricted to the precise details, and, therefore, hold myself entitled to make such changes therefrom as fairly fall within the scope of what I claim.

Having described the invention, I claim:

A cultivator guard including a bracket secured to the beam of a cultivator and having a pivot pin, a substantially triangular shaped yoke having the apex thereof apertured to receive the pivot pin, relatively spaced elements secured to the yoke at the opposite end thereof from the connection with the pivot pin, a guide plate connecting the elements and spaced from the yoke to provide a vertical guide, a bar having one end mounted on the pivot pin and extending rearwardly through the guide, said bar being bent laterally intermediate the ends thereof to offset the remaining portion of the bar from that portion received by the guide, a guard plate secured to the offset portion of the bar and supported laterally of the beam, a radially extending arm on the apex of the yoke, and a lever means for vertical adjustment of the guard plate connected to the arm and mounted on the beam.

In testimony whereof I affix my signature.

JOSEPH H. KOEBEL.